United States Patent [19]

Alphin et al.

[11] 3,856,962

[45] Dec. 24, 1974

[54] ANTI-INFLAMMATORY AGENTS

[76] Inventors: Reevis S. Alphin, 815 Westham Pky., Richmond, Va. 23229; David A. Droppleman, 2331 Clarke St., Richmond, Va. 23228

[22] Filed: Apr. 24, 1974

[21] Appl. No.: 463,624

Related U.S. Application Data

[63] Continuation-in-part of Ser. No. 377,895, July 10, 1973, abandoned.

[52] U.S. Cl.................................. 424/267, 424/272
[51] Int. Cl............................................ A61k 27/00
[58] Field of Search........................... 424/267, 272

[56] References Cited
UNITED STATES PATENTS

| | | | |
|---|---|---|---|
| 3,419,559 | 12/1968 | Lansford et al.................... | 424/250 |
| 3,455,941 | 7/1969 | Lansford et al.................... | 424/267 |
| 3,457,267 | 7/1969 | Lansford et al.................... | 424/258 |
| 3,513,236 | 5/1970 | Lansford et al.................... | 424/272 |

*Primary Examiner*—Stanley J. Friedman

[57] ABSTRACT

5-(Omega-substituted lower-alkyl)-2-oxazolidiones having the general formula:

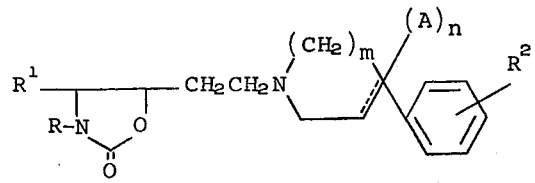

wherein R is hydrogen, lower alkyl and benzyl, $R^1$ is hydrogen and lower alkyl, $R^2$ is hydrogen, fluorine, trifluoromethyl and lower alkoxy, A is hydrogen, hydroxyl, propionyloxy and ethoxycarbonyl, $m$ is one and two, $n$ is zero and one and when $n$ is zero the dotted line represents a double bond and pharmaceutically acceptable acid addition salts thereof, ameliorate the effects of inflammatory agents. The compounds are also effective in reducing edema and have significant anti-pyretic effects when they are administered orally to warm-blooded animals at doses of from about 0.5 mg/kg. to about 100 mg/kg.

5 Claims, No Drawings

ANTI-INFLAMMATORY AGENTS

The present application is a continuation-in-part application of copending application Ser. No. 377,895 filed July 10, 1973 now abandoned.

The present invention is concerned with 5-(omega-substituted lower-alkyl)-2-oxazolidinones and the properties associated therewith in treating inflammation in warm-blooded animals and novel compositions containing the same as active ingredients. The invention is particularly concerned with ameliorating inflammation and/or edema in warm-blooded animals by administering to animals so afflicted an effective nontoxic dose of the aforementioned 5-(omega-substituted lower-alkyl)-2-oxazolidinones. The compounds also have significant anti-pyretic activity.

The 5-(omega-substituted lower-alkyl)-2-oxazolidinones which can be used in the present invention can be represented by the general formula:

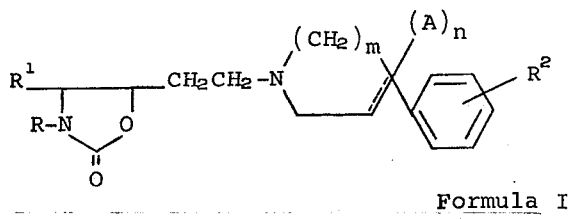

Formula I wherein;

R is selected from the group consisting of hydrogen, lower alkyl and benzyl, $R^1$ is selected from the group consisting of hydrogen and lower alkyl, $R^2$ is selected from the group consisting of hydrogen, fluorine, trifluoromethyl and lower alkoxy, A is selected from the group consisting of hydrogen, hydroxyl, propionyloxy and ethoxycarbonyl, m is one and two, n is zero and one and when n is zero the dotted line represents a double bond, and pharmaceutically acceptable acid addition salts thereof.

It is, therefore, a primary object of the present invention to provide a novel method for ameliorating inflammation in warm-blooded animals by the administration of certain 5-(omega-substituted lower-alkyl)-2-oxazolidinones. It is a further object of the invention to provide novel compositions which can be used in the novel method and which have minimal undesirable side effects. A still further object is to provide novel anti-inflammatory compositions containing the active ingredients which may be administered in low concentrations in a suitable vehicle or carrier.

Additional objects and advantages of the present invention will be apparent to one skilled in the art, and still others will become apparent in the following description of the best mode of carrying out the present invention and from the appended claims.

In the definition of symbols in the formulas hereof and where they appear elsewhere throughout this specification, the terms have the following significance.

The term "lower alkyl" as used herein includes straight and branched chain radicals of up to eight carbon atoms inclusive, preferably no more than four carbon atoms, and is exemplified by such groups as methyl, ethyl, propyl, isopropyl, butyl, sec. butyl, tertiary butyl, amyl, isoamyl, hexyl, heptyl, octyl and the like. "Lower alkoxy" has the formula —O—lower alkyl, the preferred lower alkoxy radical being methoxy.

The compounds which are used as active anti-inflammatory agents are thus the free bases and pharmaceutically acceptable acid addition salts thereof of 5-(omega-substituted lower-alkyl)-2-oxazolidinones as will readily be seen from the foregoing Formula I. The pharmaceutically acceptable acid addition salts are readily formed by treatment of the free base with the appropriate salt forming substance, including, for example, maleic acid, fumaric acid, ascorbic acid, hydrochloride acid, hydrobromic acid, or similar salt forming substances, according to general procedures which are well known in the art. The preferred pharmaceutically acceptable acid addition salt is the hydrochloride.

The compounds which can be used in practising the present invention and are set forth hereinafter in Tables I and II are either known compounds disclosed in U.S. Pat. Nos. 3,419,559; 3,455,941; 3,513,236; 3,457,267 and 3,423,418 or they can be readily prepared by following the preparative procedures outlined in the aforementioned patents. For a more complete description of the compounds utilizable as anti-inflammatory agents within the scope of the present invention, the disclosures of the patents mentioned hereinabove are incorporated by reference as fully as though set forth herein.

Table I

| Example | R | $R^1$ | $R^2$ | A | m | n | M.P. °C. |
|---|---|---|---|---|---|---|---|
| 1 | $CH_3$ | H | H | — | 2 | 0 | 102-4 |
| 2 | $C_6H_5CH_2$ | H | H | OH | 2 | 1 | 108-10 |
| 3[1] | $C_6H_5CH_2$ | H | H | $OC(O)C_2H_5$ | 2 | 1 | 162-64 |
| 4 | H | H | H | OH | 2 | 1 | 180-83 |
| 5[1] | H | H | H | $OC(O)C_2H_5$ | 2 | 1 | 186-8 |
| 6 | $C_6H_5CH_2$ | H | H | H | 2 | 1 | 96-98 |
| 7 | H | H | H | H | 2 | 1 | 134-37 |
| 8 | $C_6H_5CH_2$ | H | H | $COOC_2H_5$ | 2 | 1 | 90-92 |
| 9 | H | H | H | — | 2 | 0 | 143-45 |
| 10[2] | H | H | H | $COOC_2H_5$ | 2 | 1 | 203-05 |
| 11 | $CH_3$ | H | 4-F | — | 2 | 0 | 98-100 |
| 12[1,3] | $CH_3$ | $CH_3$ | 4-F | — | 2 | 0 | 192-96 |

Table I—Continued

| Example | R | R$^1$ | R$^2$ | A | m | n | M.P. °C. |
|---|---|---|---|---|---|---|---|
| 13[4] | CH$_3$ | CH$_3$ | 4-F | – | 2 | 0 | 101-03 |
| 14 | H | H | H | – | 1 | 0 | 106-08 |
| 15[5] | CH$_3$ | CH$_3$ | H | – | 2 | 0 | 93-103 |
| 16 | CH$_3$ | CH$_3$ | H | – | 2 | 0 | 112-14 |
| 17[6] | CH$_3$ | H | H | – | 2 | 0 | 125-26.5 |
| 18[7] | CH$_3$ | H | H | – | 2 | 0 | 125-27 |
| 19 | CH$_3$ | H | H | OH | 2 | 1 | 128-30 |
| 20[1] | CH$_3$ | H | H | OC(O)C$_2$H$_5$ | 2 | 1 | 201-03 |
| 21 | CH$_3$ | H | 4-OCH$_3$ | OH | 2 | 1 | 150-52 |
| 22[1] | CH$_3$ | H | 3-CF$_3$ | – | 2 | 0 | 207-09 |
| 23 | CH$_3$ | H | 3-CF$_3$ | OC(O)C$_2$H$_5$ | 2 | 1 | 188-90 |
| 24 | CH$_3$ | H | 4-OCH$_3$ | – | 2 | 0 | 118.5-21 |
| 25 | H | H | 4-OCH$_3$ | OH | 2 | 1 | 178.5-80 |
| 26 | H | H | 4-OCH$_3$ | – | 2 | 0 | 172-74 |
| 27[1] | CH$_3$ | H | 3-CF$_3$ | OH | 2 | 1 | 221-23 |
| 28[1] | CH$_3$ | H | 3-CF$_3$ | H | 2 | 1 | 229-31 |

[1]Hydrochloride salts; [2]Hydrochloride-monohydrate; [3]60% cis-40% trans isomer; [4]trans isomer; [5]50% cis-50% trans isomer; [6](+) isomer; [7](-) isomer.

Table II

Analytical Data on Examples 1 through 28

| Example No. | Empirical Formula | Calculated C | H | N | Found C | H | N |
|---|---|---|---|---|---|---|---|
| 1 | C$_{17}$H$_{22}$N$_2$O$_2$ | 71.30 | 7.74 | 9.78 | 71.29 | 7.72 | 9.71 |
| 2 | C$_{23}$H$_{28}$N$_2$O$_3$ | 72.60 | 7.42 | 7.36 | 72.51 | 7.34 | 7.26 |
| 3 | C$_{26}$H$_{33}$ClN$_2$O$_4$[1] | 66.02 | 7.03 | 5.92 | 65.92 | 7.02 | 6.02 |
| 4 | C$_{16}$H$_{22}$N$_2$O$_3$ | 66.18 | 7.64 | 9.65 | 66.29 | 7.73 | 9.54 |
| 5 | C$_{19}$H$_{27}$ClN$_2$O$_4$[1] | 59.60 | 7.11 | 7.32 | 58.91 | 7.31 | 7.12 |
| 6 | C$_{23}$H$_{28}$N$_2$O$_2$ | 75.79 | 7.74 | 7.69 | 75.74 | 7.92 | 7.74 |
| 7 | C$_{16}$H$_{22}$N$_2$O$_2$ | 70.04 | 8.08 | 10.21 | 69.92 | 8.06 | 9.98 |
| 8 | C$_{26}$H$_{32}$N$_2$O$_4$ | 71.53 | 7.39 | 6.42 | 71.50 | 7.47 | 6.46 |
| 9 | C$_{16}$H$_{20}$N$_2$O$_2$ | 70.56 | 7.40 | 10.29 | 70.65 | 7.36 | 10.24 |
| 10 | C$_{19}$H$_{29}$ClN$_2$O$_5$[2] | 56.92 | 7.29 | 6.99 | 57.31 | 7.07 | 7.02 |
| 11 | C$_{17}$H$_{21}$FN$_2$O$_2$ | 67.08 | 6.96 | 9.20 | 66.97 | 6.88 | 9.14 |
| 12 | C$_{18}$H$_{23}$FN$_2$O$_2$[1,3] | 67.90 | 7.28 | 8.80 | 67.89 | 7.33 | 8.74 |
| 13 | C$_{18}$H$_{24}$ClFN$_2$O$_2$[4] | 60.92 | 6.82 | 7.90 | 60.97 | 6.79 | 7.88 |
| 14 | C$_{15}$H$_{18}$N$_2$O$_2$ | 69.74 | 7.02 | 10.84 | 69.59 | 7.13 | 10.89 |
| 15 | C$_{18}$H$_{24}$N$_2$O$_2$[5] | 71.97 | 8.05 | 9.32 | 71.71 | 8.22 | 9.38 |
| 16 | C$_{18}$H$_{24}$N$_2$O$_2$ | 71.97 | 8.05 | 9.32 | 71.66 | 8.27 | — |
| 17 | C$_{17}$H$_{22}$N$_2$O$_2$[6] | 71.30 | 7.74 | 9.78 | — | — | — |
| 18 | C$_{17}$H$_{22}$N$_2$O$_2$[7] | 71.30 | 7.74 | 9.78 | — | — | — |
| 19 | C$_{17}$H$_{24}$N$_2$O$_3$ | 67.08 | 7.95 | 9.20 | 67.47 | 8.02 | 9.46 |
| 20 | C$_{20}$H$_{29}$ClN$_2$O$_4$[1] | 60.52 | 7.36 | 7.09 | 60.27 | 7.54 | 7.45 |
| 21 | C$_{18}$H$_{26}$N$_2$O$_4$ | 64.65 | 7.84 | 8.38 | 64.74 | 7.86 | 8.31 |
| 22 | C$_{18}$H$_{22}$ClF$_3$N$_2$O$_2$[1] | 55.31 | 5.67 | 7.17 | 55.14 | 5.79 | 7.25 |
| 23 | C$_{21}$H$_{28}$ClF$_3$N$_2$O$_4$[1] | 54.25 | 6.07 | 6.03 | 54.19 | 6.28 | 5.97 |
| 24 | C$_{18}$H$_{24}$N$_2$O$_3$ | 68.33 | 7.65 | 8.85 | 68.32 | 7.68 | 8.90 |
| 25 | C$_{17}$H$_{24}$N$_2$O$_4$ | 63.72 | 7.55 | 8.75 | 63.78 | 7.57 | 8.76 |
| 26 | C$_{17}$H$_{22}$N$_2$O$_3$ | 67.52 | 7.33 | 9.27 | 67.38 | 7.19 | 9.10 |
| 27 | C$_{18}$H$_{24}$ClF$_3$N$_2$O$_3$[1] | 52.88 | 5.91 | 6.85 | 52.71 | 5.86 | 6.94 |
| 28 | C$_{18}$H$_{24}$ClF$_3$N$_2$O$_2$ | 55.03 | 6.16 | 7.13 | 55.24 | 6.37 | 7.05 |

The compounds having the foregoing Formula I and set forth hereinabove in Table I were evaluated for anti-inflammatory properties in a modification of the Evans Blue-Carrageenan Pleural Effusion assay of Sancilio, L. F., J. Pharmacol. Exp. Therap. 168, 199-204 (1969). In the modified procedure the concentration of carrageenan was 0.5 percent rather than 0.025 percent and the volume of pleural fluid was measured at 5 hours instead of 6 hours. The compounds were tested using aspirin as a reference standard in side-by-side comparison. While all the compounds tested were found to be active as anti-inflammatory agents, the compound of Example 1, 3-methyl-5-[2-(4-phenyl-3,4-dehydropiperidinyl)ethyl]-2-oxazolidinone, was tested further because of its potency. The compound was found to (a) be an effective antagonist to carrageenan-induced edema in the paw of the rat, (b) be an effective antagonist to carrageenan-induced edema in the adrenalectomized rat, (c) be effective against bradykinin induced edema, (d) have significant anti-pyretic properties, (e) be more effective than phenylbutazone in reducing fluid formation in the granuloma pouch rat and (f) be effective in the adrenalectomized pouch rat. Some of the data obtained in the foregoing methods are summarized in the following tables.

Table III

Effect of Example 1 and Aspirin on the Evans Blue-Carrageenan-Induced Pleural Effusion in Rats

| Material | Dose mg/kg | No. of Rats | Volume Pleural ±S.D. | % Reduction | P Value |
|---|---|---|---|---|---|
| Example 1 | 31.6 | 6 | 6.7 ± 1.33 | 1.5 | > 0.5 |
| | 100.0 | 6 | 4.8 ± 0.30 | 29.4 | <0.5 |
| | 316.0 | 4 | 4.4 ± 0.37 | 35.3 | <0.5 |
| Aspirin | 316.0 | 6 | 4.7 ± 0.36 | 30.9 | <0.5 |
| Control | | 8 | 6.8 ± 0.77 | | |

Table III[1]

Inhibition of Carrageenan-Induced Edema in Rat Paws

| Material | No. Animals | Dose I.P. mg/kg | % Inhibition |
|---|---|---|---|
| Example 1 | 5 | 20.0 | 25.0 |
| Aspirin | 5 | 50.0 | 16.6 |
| | 5 | 100.0 | 27.1 |
| | 5 | 200.0 | 51.3 |
| Phenylbutazone | 5 | 50.0 | 39.2 |
| Indomethacin | 5 | 5.0 | 44.7 |
| | 5 | 10.0 | 67.2 |

[1]The method used was that of Winter et al., Proc. Soc. Biol. and Med. 111, 544 (1962).

Table IV[2]

Inhibition of Carrageenan-Induced Edema in Rat Paws

| Material | No. Animals | Dose P.O. mg/kg | % Inhibition | ED$_{50}$ mg/kg |
|---|---|---|---|---|
| Example 1[1] | 15 | 8 | 9.8 | |
| | 15 | 15 | 30.2 | 24.5 |
| | 15 | 30 | 54.7 | |
| | 15 | 57 | 82.2 | |
| Indomethacin | 5 | 2.5 | 14.0 | 10.1 |
| | 5 | 5.0 | 29.0 | |
| | 5 | 10.0 | 48.6 | |
| Phenyl-butazone | 15 | 12.5 | 3.9 | 394 (approx.) |
| | 15 | 25.0 | 8.6 | |
| | 15 | 50.0 | 12.3 | |
| | 15 | 100.0 | 37.1 | |
| Aspirin[1] | 15 | 50.0 | 5.9 | 465 (approx.) |
| | 15 | 100.0 | 9.3 | |
| | 15 | 200.0 | 29.7 | |
| | 15 | 400.0 | 46.7 | |

[1]95% Fiducial Limits
Example 1 22.2 – 28.8
Aspirin 411.6 – 916.2
[2]Same test procedure as in Table III.

Table V[1]

Effect of Example 1 on Carrageenan-Induced Edema in the Adrenalectomized Rat

| | No. Animals | Dose P.O mg/kg | % Inhibition |
|---|---|---|---|
| Non-adrenalectomized | 5 | 20 | 37.3 |
| | 5 | 40 | 57.3 |
| | 7 | 20 | 21.9 |
| Adrenalectomized | 7 | 40 | 40.5 |

[1]Same test procedure as in Table III.

Effective quantities of any of the foregoing pharmacologically active compounds may be administered internally to animals, including humans, in any one of various ways, for example, orally as in capsules or tablets, parenterally in the form of sterile solutions or suspensions, and in some cases intraveneously in the form of sterile solutions. The basic amino compounds, while effective, are preferably formulated and administered in the form of their pharmaceutically acceptable acid addition salts for purposes of convenience of crystallization, increased solubility and the like. When the active compounds are used in veterinary practice, they can be given per se as an additive to the feed or to the drinking water.

Although very small quantities of the active materials of the present invention, even as low as 0.1 mg., are effective when minor therapy is involved or in cases of administration to animals, including humans, having a relatively low body weight, unit dosages are usually 5 mg. or above and can be preferably 10, 25 and 50 mg. depending, of course, on the emergency of the situation; 5 mg. to 25 mg. appears optimum per unit dose. The active agents may be combined with other pharmacologically active agents, or with buffers, antacids or the like, for administration. It is only necessary that the active ingredient constitute an effective amount, i.e., such that a suitable effective dosage will be obtained consisting with the dosage form employed. Obviously, several unit dosages may be administered at about the same time.

Pharmaceutical carriers which can be used in the novel compositions of the present invention can be solids and liquids. Solid carriers can include, but are not limited to, lactose, starch, magnesium stearate, corn starch, dicalcium phosphate, gelatin and calcium stearate. Liquid carriers can include, but are not limited to, peanut oil, olive oil, sesame oil, and water.

What is claimed is:

1. A process for the amelioration of distress caused by inflammation which comprises administering orally to a warm-blooded animal suffering from inflammation an effective amount of a compound selected from those having the formula:

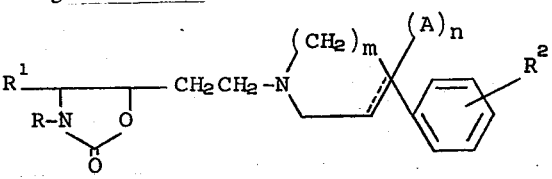

wherein;
R is selected from the group consisting of hydrogen, lower alkyl and benzyl,
R$^1$ is selected from the group consisting of hydrogen, and lower alkyl,
R$^2$ is selected from the group consisting of hydrogen, fluorine, trifluoromethyl and lower alkoxy,
A is selected from the group consisting of hydrogen, hydroxyl, propionyloxy and ethoxycarbonyl,
m is one and two,
n is zero and one and when n is zero the dotted line represents a double bond, and
pharmaceutically acceptable acid addition salts thereof.

2. The process of claim 1 wherein said effective amount is between 0.5 and 100.0 mg./kg.

3. The process of claim 2 wherein said effective amount is between 0.5 and 30.0 mg./kg.

4. A process for the amelioration of distress caused by inflammation which comprises administering orally to a warm-blooded animal suffering from inflammation an effective amount of 3-methyl-5-[2-(4-phenyl-3,4-dehydropiperidinyl)ethyl]-2-oxazolidinone.

5. The process of claim 4 wherein said effective amount is between 0.5 and 100 mg./kg.

* * * * *

UNITED STATES PATENT OFFICE
CERTIFICATE OF CORRECTION

Patent No. 3,856,962  Dated Dec. 24, 1974

Inventor(s) Reevis S. Alphin and David A. Droppleman

It is certified that error appears in the above-identified patent and that said Letters Patent are hereby corrected as shown below:

Underneath Table II, in Columns 3 and 4, please add the following footnote:

--[1]Hydrochloride salts; [2]Hydrochloride-monohydrate; [3]60% cis-40% trans isomer; [4]trans isomer; [5]50% cis-50% trans isomer; [6](+) isomer; [7](-) isomer--

Signed and sealed this 11th day of March 1975.

(SEAL)
Attest:

RUTH C. MASON
Attesting Officer

C. MARSHALL DANN
Commissioner of Patents
and Trademarks